(No Model.)
T. F. MILLER.
CORN PLANTER.
No. 370,804. Patented Oct. 4, 1887.
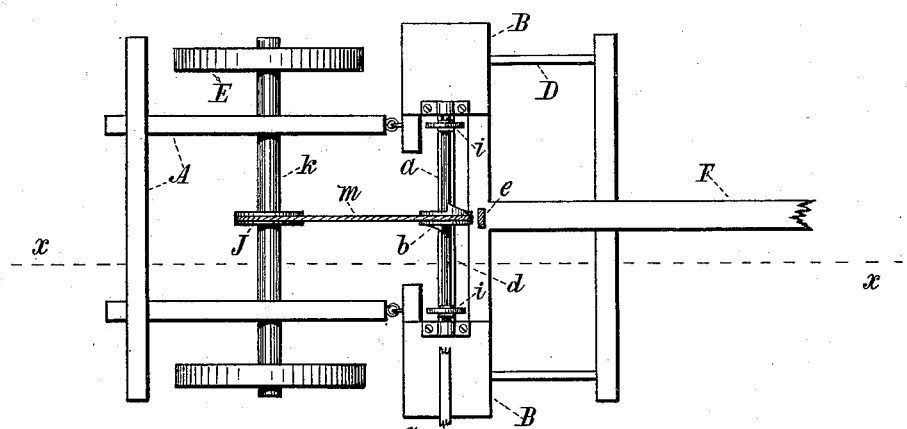
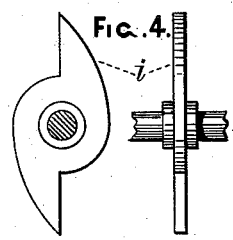
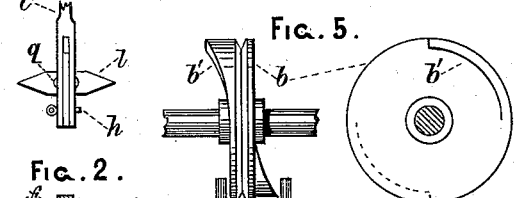
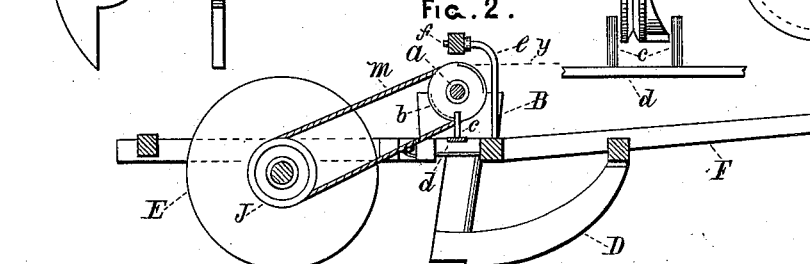
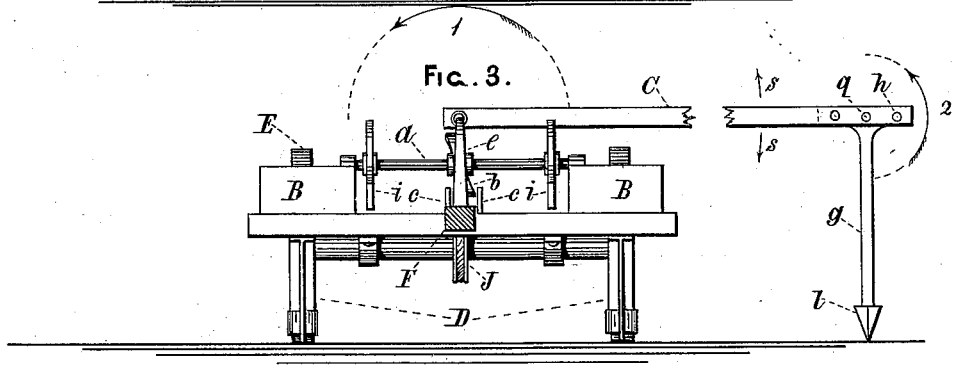
Witnesses
J. W. McEvers.
W. H. Miller.
Inventor
Theodore F. Miller.
By his Attorney F. S. Davenport.

UNITED STATES PATENT OFFICE.

THEODORE F. MILLER, OF GILLESPIE, ILLINOIS.

CORN-PLANTER.

SPECIFICATION forming part of Letters Patent No. 370,804, dated October 4, 1887.

Application filed July 9, 1887. Serial No. 243,889. (No model.)

*To all whom it may concern:*

Be it known that I, THEODORE F. MILLER, of Gillespie, in the county of Macoupin and State of Illinois, have invented a new and Improved Corn-Planter; and I do hereby declare that the following is a full and exact description of the same, reference being had to the accompanying drawings, and to the letters of reference marked thereon.

My invention relates to an improvement in corn-planters, my object being to adapt the mechanism by which the dropper-plates are actuated to operate a ground-marker of novel construction adapted to make a discontinuous mark or furrow and be transferable from one side of the planter to the other. These objects I attain by the mechanism explained in the following specification, and illustrated in the accompanying drawings, in which—

Figure 1 is a top or plan view of the planter equipped with my device; and Fig. 2 is a vertical section of the same, taken in the line $x$ $x$, Fig. 1. Fig. 3 is a front elevation of the planter. Fig. 4 is an enlarged front and side view of the cam by which the ground-marker is actuated, and Fig. 5 is an enlarged front and side view of the cam by which the dropper-plates are actuated.

In the drawings, A represents the frame of the planter; B, the seed boxes or hoppers; D, the runners; E, the wheels, and F the tongue.

In the upper part of the hoppers is journaled a horizontal shaft, $a$, provided near its center with a pulley, $b$, having upon each of its sides, and located at diametrically-opposite points, a segmental flange, $b'$, (see Fig. 5,) projecting laterally therefrom, so as to form a cam adapted to rotate between two studs, $c$, secured in the top side of the dropper-bar $d$. Immediately in front of said dropper-bar, and secured to the forward part of the frame of the machine, is a standard, $e$, provided at the top with a stud, $f$, Fig. 2, upon which is fulcrumed the inner end of a long arm, C, extending laterally beyond the runner D to a distance equal to one and a half time the distance between the rows of corn.

It will be here observed that the upper portion of the standard $e$ is removed at the line $y$, Fig. 2, and also that the inner end of the arm C is omitted in Fig. 1, in order to show more fully the cam wheel or pulley $b$ and the shaft upon which it is keyed.

Pivoted to the outer end of the arm C is a short arm, $g$, secured upon a pivot, $q$, and retained in position by a pin, $h$, the lower end provided with a shoe, $l$.

Near each end of the shaft $a$ is a cam, $i$, of the form shown in Fig. 4, and located with reference to the arm C so as to lift and drop alternately as it revolves the outer end of said arm, as indicated by the arrows S S, Fig. 3.

Upon the central part of the revolving axle $k$ is keyed a pulley, J, provided with a band or chain, M, which passes round the pulley $b$ on the shaft $a$ for the purpose of rotating the latter.

The several parts of my device being constructed and combined as above described, its operation is as follows: As the planter is drawn forward, the revolving axle $k$, by means of the pulleys J and $b$ and the belt or chain which passes round them, causes the shaft $a$ to revolve, and with it the cams $b$ and $i$. The former, acting alternately upon the studs $c$ $c$ in the dropper-bar $d$, imparts to the latter the requisite reciprocating motion for actuating the dropper-plates in the seed-boxes, while the cam $i$ lifts and drops alternately the arm C, and thus marks out upon the ground a line of equidistant depressions, which the driver keeps in view between the two horses in running each course, by this means insuring equidistant and parallel rows of corn.

Having fully described my invention, what I claim as new, and desire to secure by Letters Patent, is—

In a corn-planter provided with a shaft, $a$, actuated by pulleys J and $b$, and a band or chain, M, the combination, with said parts, of the cams $i$ $i$ and a marker-arm, C, the latter fulcrumed at its inner end upon a stud, $f$, in the standard $e$, and having at its opposite end a short reversible arm, $g$, provided with a shoe, $l$, all constructed and adapted to operate the marker intermittently, as and for the purpose set forth.

In testimony that I claim the foregoing I have hereunto set my hand this 16th day of March, 1887.

THEODORE F. MILLER.

Witnesses:
W. B. LYON,
ROBT. BROWN.